United States Patent Office 3,418,367
Patented Dec. 24, 1968

3,418,367
N'-SUBSTITUTED N-ARYLSULFONYL UREAS
Henri Dietrich, Arlesheim, Basel-Land, Switzerland, assignor to Geigy Chemical Corporation, Greenburgh, N.Y., a corporation of Delaware
No Drawing. Filed Mar. 22, 1965, Ser. No. 441,847
Claims priority, application Switzerland, Mar. 26, 1964, 3,978
11 Claims. (Cl. 260—553)

ABSTRACT OF THE DISCLOSURE

The compounds of the class of N-arylsulfonyl-N'-(tricyclo[4,3,1,1$^{3,8}$]undec-3-yl) ureas, useful as hypoglycaemic agents. An illustrative embodiment is N-(p-tolylsulfonyl)-N'-(tricyclo[4,3,1,1$^{3,8}$]undec-3-yl)urea.

Detailed disclosure

This invention relates to new N'-substituted N-arylsulfonyl ureas which have valuable pharmacological properties, as well as to processes for the production thereof.

It has been found that N'-substituted N-arylsulfonyl ureas which in their free acid form correspond to the formula

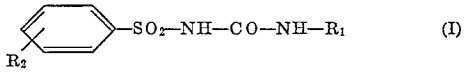

wherein R$_1$ represents the tricyclo[4.3.1.1$^{3,8}$]undec-3-yl radical of the formula

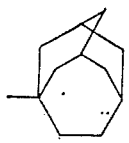

and R$_2$ represents hydrogen, halogen, especially fluorine, chlorine or bromine, a lower alkyl, lower alkenyl or lower alkoxy radical lower in the foregoing three radicals meaning radical with at most 3 carbon atoms, the methylthio or acetyl group or, together with the phenyl radical, the 5,6,7,8-tetrahydronaphthyl-(2) radical, the corresponding compound being of the formula

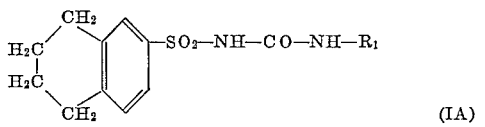

have a strong hypoglycemic action when administered orally or parenterally even in very low dosages. The high activity of these compounds is all the more surprising as, with series of known N-arylsulfonyl-N'-alkyl ureas, the strongest action up to the present has been determined in compounds in which the N'-alkyl moiety contains from 3 to 4 carbon atoms. In contrast to the dosages necessary for obtaining a satisfactory hypoglycemic action, the toxic dosages of the new compounds defined above are even higher than those of known pharmaceutically accepted oral antidiabetic agents. Consequently, the therapeutical index of the new compounds of Formulas I and IA, according to the invention, when used as oral antidiabetica, is unexpectedly much more favorable than that of the known therapeutically accepted antidiabetic agents.

The term "N'-substituted N-arylsulfonyl urea" as used in this specification and in the appended claims means not only the free acid form of such urea having the acid hydrogen atom in the —SO$_2$—NH— bridge, but also the pharmaceutically acceptable salts thereof with bases, namely the ammonium and alkali metal salts, especially the sodium salt and pharmaceutically acceptable salts with organic bases, more in particular the lower alkyl ammonium salts, the ethanolammonium salt, the diethanolammonium salt, the N,N-diethyl-N-hydroxyethyl-ammonium salt and the morpholinium salt.

The fact that the compounds of Formula I have strong hypoglycemic action is particularly surprising in view of the fact that change of the molecular weight of the corresponding N'-adamantyl-substituted compound, which is known to be strongly hypoglycemic by increase of the molecular weight of the adamantyl moiety by that of CH$_2$, resulting in the moieties

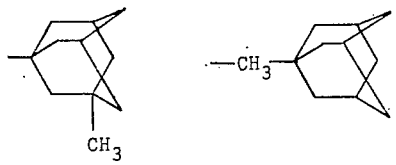

leads to far-reaching or practically complete loss of hypoglycemic activity.

The new compounds of Formula I are produced by reacting, optionally in the presence of a condensing agent, tricyclo[4.3.1.1$^{3,8}$]undecane-3-amine with an arylsulfonyl isocyanate corresponding to the formula

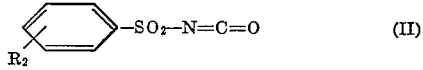

wherein R$_2$ has the same meaning as in Formula I, or with a reactive functional derivative of an N-arylsulfonyl carbamic acid corresponding to the formula

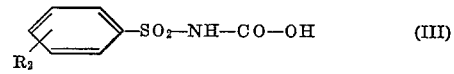

wherein R$_2$ has the same meaning as in Formula I, and/or, if necessary, partially hydrolyzing an N-arylsulfonyl-N'-(tricyclo[4.3.1.1$^{3,8}$]undec-3-yl)-guanidine obtained in the first step to form the corresponding area.

The tricyclo[4.3.1.1$^{3,8}$]undecane-3-amine used according to the invention is a new compound which can be produced from the known tricyclo[4.3.1.1$^{3,8}$]undecane-3-carboxylic acid by way of its amide and tricyclo [4.3.1.1$^{3,8}$]undec-3-yl isocyanate as described in detail further below.

Examples of reactive functional derivatives of carbamic acids of Formula III are their lower alkyl esters, in particular methyl and ethyl esters and also their amides. N-methylamides, N,N-dimethylamides and N-acylamides, i.e. for example, N-arylsulfonyl ureas, N-aryl-sulfonyl-N'-methyl ureas, N-arylsulfonyl-N',N'-dimethyl ureas, N-arylsulfonyl-N'-alkanoyl ureas, N-arylsulfonyl-N'-benzoyl ureas and N,N'-bis-arylsulfonyl ureas substituted corresponding to the definitions of R$_2$. Also, their halides, particularly their chlorides, or their nitriles can be used as reactive functional derivatives of carbamic acids of Formula III. The latter derivatives, i.e. N-arylsulfonyl cyanamides on reaction with tricyclo[4.3.1.1$^{3,8}$]undecane-3-amine form first the guanidines mentioned above. The reactions are performed, for example, while heating the mixture of reactants in inert organic solvents such as, e.g. diethyl ether, dioxan, benzene, chlorobenzene, toluene, xylene, β-methoxyethanol or butanone. The reactions with isocyanates, carbamic acid esters or ureas can also be performed in the absence of solvents or diluents. Also, these reactions generally do not require the use of condensing agents; if desired, however, alkali alcoholates, for example, can be used as such agents. Other condensing agents which can be used in reactions with isocyanates are tertiary organic bases; but the isocyanates can also be reacted in the form of adducts with tertiary organic bases.

Tertiary organic bases such as pyridine, triethylamine or tributylamine also serve, for example, as condensing agents in reactions with carbamic acid chlorides. Hydrogen chloride for example, serves as condensing agent in reactions with carbamic acid nitriles (N-arylsulfonyl cyanamides), or instead of the free tricyclo[4.3.1.1$^{3,8}$]undecane-3-amine, a salt thereof, in particular the hydrochloride, is used.

In the compounds of Formula I, $R_2$ is, e.g. hydrogen, chloride, fluorine, bromine, the methyl, ethyl, propyl, isopropyl, vinyl, allyl, methoxy, ethoxy, n-propoxy, isopropoxy, acetyl or methylthio radical.

The new compounds according to the invention can be used as oral antidiabetica for the treatment of diabetes mellitus either as such or in the form of their salts, e.g. ammonium or alkali salts or salts with pharmacologically acceptable organic bases or in the presence of substances causing salt formation such as e.g. alkali carbonates and bicarbonates. They are administered in the usual dosage forms for this purpose.

The new active substances are preferably administered perorally. The daily dosages vary between 25.0 and 600 mg. for adult patients. Suitable dosage units such as dragées (sugar coated tablets), tablets, preferably contain 50–500 mg. of an active substance according to the invention, actually 20 to 80% of a compound of general Formula I. Such units are produced by combining the active substance with, e.g. solid, pulverulent carriers such as lactose, saccharose, sorbitol, mannitol; starches such as potato starch, maize starch or amylopectin, also laminaria powder or citrus pulp powder; cellulose derivatives or gelatines, optionally with the addition of lubricants such as magnesium or calcium stearate or polyethylene glycols (carbowaxes) of suitable molecular weights, to form tablets or dragée cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings e.g. to distinguish between various dosages of active substances.

The following instructions further illustrate the production of tablets and dragées:

(a) 1000 g. of N-(p-toluenesulphonyl)-N'-(tricyclo[4.3.1.1$^{3,8}$]undec-3-yl) urea are mixed with 500 g. of lactose and 270 g. of potato starch. The mixture is moistened with an aqueous solution of 8.0 g. of gelatine and granulated through a sieve. After drying, 60.0 g. of potato starch, 60.0 g. of talcum, 10.0 g. of magnesium stearate and 20.0 g. of colloidal silicium dioxide are mixed in and the mixture is pressed into 10,000 tablets each weighing 200 mg. and containing 100 mg. of active substance. If desired, the tablets can be grooved for better adaptation of the dosage.

(b) A granulate is produced from 1000 g. of N-(p-chloro - phenyl-sulphonyl)-N'-(tricyclo[4.3.1.1$^{3,8}$]undec-3-yl) urea, 345 g. of lactose and the aqueous solution of 6.0 g. of gelatine. After drying, this granulate is mixed with 10 g. of colloidal silicium dioxide, 40 g. of talcum, 40 g. of potato starch and 5 g. of magnesium stearate and the whole is pressed into 10,000 dragée cores. These are then coated with a concentrated syrup consisting of 533 g. of crystallised saccharose, 20 g. of shellac, 75 g. of gum arabic, 250 g. of talcum, 20 g. of colloidal silicium dioxide and 1.5 g. of dyestuff and dried. Each of the dragées obtained weighs 240 mg. and contains 100 mg. of active substance.

The following examples further illustrates the production of the new compounds, but are by no means the only methods of performing the process according to the invention. The temperatures are in degrees centigrade.

Example 1

(a) 58.0 g. (0.3 mol) of tricyclo[4.3.1.1$^{3,8}$]undecane-3-carboxylic acid in 350 ml. of freshly distilled thionyl chloride are refluxed for 45 minutes. 500 ml. of anhydrous benzene are added to the residue obtained by distilling off the excess reactant, the solution is evaporated to dryness and the residue is finally dissolved in 200 ml. of anhydrous tetrahydrofuran. The solution obtained of the crude acid chloride is added dropwise to 500 ml. of an aqueous ammonia solution which has been saturated at 0° whereupon the amide precipitates. After diluting with 1000 ml. of water, the amide is filtered off, the filter residue is washed three times with 200 ml. of cold water each time and taken up in methylene chloride. This solution is dried over magnesium sulphate, evaporated to dryness and the residue is recrystallised from cyclohexane/benzene whereupon pure tricyclo[4.3.1.1$^{3,8}$]undecane-3-carboxylic acid amide is obtained; M.P. 166–168°.

(b) 50.0 g. (0.26 mol) of the amide obtained according to (a) are added at 5° to a mixture of 62 g. of sodium hydroxide, 520 ml. of distilled water and 49.5 g. (0.31 mol) of bromine whereupon the temperature rises to 10°. The yellow, milky emulsion is stirred first for 10 minutes at 5° and then for 1 hour at 80°. After cooling, the reaction mixture is poured into 500 ml. of cold water, the yellow precipitate is filtered off, washed three times with 100 ml. of cold water each time and finally dissolved in 500 ml. of methylene chloride. The solution so obtained is washed with 200 ml. of 2 N hydrochloric acid and with water, dried over magnesium sulphate and evaporated to dryness. After recrystallising the residue from ethanol, pure tricyclo[4.3.1.1$^{3,8}$]undec-3-yl isocyanate is obtained; M.P. 144–146°.

(c) 29.0 g. (0.152 mol) of the isocyanate obtained according to (b) in 400 ml. of 2 N hydrochloric acid and 200 ml. of dioxan are refluxed for 3 hours. The dioxan is then distilled off, the acid aqueous phase which remains is then first washed with ether and then made alkaline, in the presence of 500 ml. of fresh ether, with concentrated sodium hydroxide solution and extracted twice with 500 ml. of ether each time. The ether extracts of the alkaline phase are combined, dried with sodium sulfate and evaporated. The residue is sublimed at 110° under 0.01 mm. Hg and yields pure tricyclo[4.3.1.1$^{3,8}$]undecane-3-amine; M.P. 191–193°, pK in methoxyethanol: 9.55.

(d) 16.5 of tricyclo[4.3.1.1$^{3,8}$]undecane-3-amine are dissolved in 100 ml. of anhydrous toluene and 20 g. of o-tolylsulfonyl isocyanate are added. After some time the reaction product crystallizes out. Petroleum ether is added to the reaction mixture, the reaction product is filtered off and washed with petroleum ether. Rrecrystallized from methanol, the pure N - (p - tolylsulfonyl)-N'-(tricyclo[4.3.1.1$^{3,8}$]undec-3-yl)urea melts at 174–176°.

(e) 3.6 g. of N - (p - tolylsulfonyl) - N' - (tricyclo[4.3.1.1$^{3,8}$]undec-3-yl) urea are dissolved in 25 ml. of acetone and 0.8 g. of diethylamine are added. The desired diethylamine salt of N-(p - tolylsulfonyl) - N' - tricyclo[4.3.1.1$^{3,8}$]undec-3-yl) urea immediately crystallizes out. It is filtered off and dried in vacuo; M.P. 124–125°.

By replacing diethylamine in the above reaction by equivalent amounts of ethanolamine, diethanolamine, diethylaminoethanol or morpholine, the corresponding salts are obtained.

The sodium salt of N-(p-tolylsulfonyl)-N'-(tricyclo[4.3.1.1³,⁸] undec-3-yl) urea is obtained by adding the above solution of the free acid to a 2-normal aqueous sodium hydroxide solution, concentrating the mixture until the desired salt crystallizes and separating the crystals by filtration from the mother liquor and drying the same.

Example 2

N - p - chlorophenylsulfonyl - N' - (tricyclo[4.3.1.1³,⁸] undec-3-yl)urea (M.P. 154–155°) is produced analogously to Example 1(d) from 16.5 g. of tricyclo[4.3.1.1³,⁸] undecane-3-amine and 21.8 g. of p-chlorophenylsulfonyl isocyanate.

Example 3

N - (p - fluorophenylsulfonyl)-N'-(tricyclo[4.3.1.1³,⁸] undec-3-yl)urea (M.P. 164.5–166°) is obtained analogously to Example 1(d) from 16.5 g. of tricyclo[4.3.1.1³,⁸]-undecane-3-amine and 20.1 g. of p-fluorophenylsulfonyl isocyanate.

Example 4

N - phenylsulfonyl - N' - (tricyclo[4.3.1.1³,⁸]undec-3-yl)-urea is produced analogously to Example 1(d) from 16.5 g. of tricyclo[4.3.1.1³,⁸]undecane-3-amine and 18.3 g. of phenylsulfonyl isocyanate.

Example 5

16.5 g. of tricyclo[4.3.1.1³,⁸]undecane-3-amine in 200 ml. of dioxan are added to 24.3 g. of N-(p-tolylsulfonyl)-ethylurethane (M.P. 82–83°) in 600 ml. of dioxan whereupon a thick crystal slurry is formed. The reaction mixture is then boiled, the liberated alcohol is distilled off and the crystal slurry is gradually changed into a solution. After about 3 hours, the solution is evaporated to dryness. The residue is recrystallized from methanol whereupon the pure N - (p - tolylsulfonyl) - N' - (tricyclo[4.3.1.1³,⁸] undec-3-yl) urea melts at 174–176°. It is identical with the product obtained according to Example 1(d).

Example 6

16.5 g. of tricyclo[4,3,1,1³,⁸]undecane-3-amine in 200 ml. of dioxan are added to 24.95 g. of N-(p-chlorophenyl-sulfonyl)-methyl urethane in 500 ml. of dioxan and the whole is boiled until the salt formed is dissolved. Methanol is continually distilled off. The reaction mixture is then evaporated to dryness in vacuo and the residue is recrystallized from methanol. The N-(p-chlorophenyl-sulfonyl)-N'-(tricyclo[4,3,1,1³,⁸]undec-3-yl)-urea is identical with the product from Example 2 and melts at 154–155°.

Example 7

N - (p-methoxy-phenylsulfonyl)-N'-(tricyclo[4,3,1,1³,⁸] undec-3-yl) urea (M.P. 166–167.5°) is obtained analogously to Example 6 from 24.5 g. of N-(p-methoxyphenyl-sulfonyl) - methyl urethane and 16.5 g. of tricyclo [4,3,1,1³,⁸]undecane-3-amine.

Example 8

(a) 16.5 g. of tricyclo[4,3,1,1³,⁸]undecane-3-amine in 200 ml. of dioxan are added to 21.4 g. of p-tolylsulfonyl-urea in 500 ml. of dioxan and the mixture is boiled while stirring. The salt which precipitates dissolves during the boiling, while ammonia is split off. On completion of ammonia development, the solution is concentrated in vacuo. The residue is recrystallized from methanol and is the pure N-(p-tolysulfonyl)-N'-(tricyclo[4,3,1,1³,⁸]un-dec-3 - yl)-urea (identical with that of Examples 1(d) and 5).

(b) N - (p - chlorophenylsulfonyl - N'-(tricyclo[4,3,1, 1³,⁸]undec-3-yl) urea (M.P. 154–155°) is obtained analogously to Example 8 from 23.45 g. of p-chlorophenyl-sulfonyl urea and 16.5 g. of tricyclo[4,3,1,1³,⁸]undecane-3-amine; identical with the product of Example 2.

Example 9

(a) The pure N-(p-acetyl-phenylsulfonyl) - N'-(tricyclo-[4,3,1,1³,⁸]undec-3-yl)-urea is obtained analogously to Example 8 from 24.2 g. of (p-acetyl-phenylsulfonyl)-urea and 16.5 g. of tricyclo[4,3,1,1³,⁸]undecane-3-amine. Recrystallized from methanol it melts at 153–156°.

Also analogously to Example 8a, on using 23.45 g. of N-(m-chlorophenylsulfonyl)-urea, N-(m - chlorophenyl-sulfonyl)-N'-(tricyclo[4,3,1,1³,⁸]undec-3-yl)-urea, is obtained;

On using 27.9 g. of N-(p-bromophenylsulfonyl)-urea, N - (p - bromophenylsulfonyl)-N'-(tricyclo[4,3,1,1³,⁸]un-dec-3-yl)-urea, is obtained;

On using 23.45 g. of N-(o-chlorophenylsulfonyl)-urea, N - (o - chlorophenylsulfonyl) - N' - tricyclo[4,3,1,1³,⁸]-undec-3-yl)-urea is obtained;

On using 24.4 g. of N-(p-ethoxyphenylsulfonyl)-urea N - (p - ethoxyphenylsulfonyl) - N' - (tricyclo[4,3,1,1³,⁸]-undec-3-yl)-urea is obtained; and on using 24.6 g. of N-(p-methylthiophenylsulfonyl)-urea, N-(p - methylthio-phenylsulfonyl) - N' - (tricyclo[4,3,1,1³,⁸]undec - 3 - yl)-urea is obtained.

Example 10

N - (2.4 - dichlorophenylsulfonyl) - N'-(tricyclo[4,3,1, 1³,⁸]undec-3-yl)-urea is obtained analogously to Example 1(d) from 16.5 g. of tricyclo[4,3,1,1³,⁸]undecane-3-amine with 25.3 g. of 2,4-dichlorophenylsulfonyl isocyanate, and with 23.7 g. of [5,6.7,8-tetrahydro-naphthyl-(2)-sulfonyl]-isocyanate (B.P.$_{132-134°/0.01 \text{ torr}}$), N-[5,6,7,8-tetrahydro-naphthyl-(2)-sulfonyl] - N' - tricyclo[4,3,1,1³,⁸]-undec-3-yl)-urea, M.P. 178–179°, is obtained.

Example 11

23.4 g. of p-tolylsulfonyl carbamic acid chloride are added to 16.5 g. of tricyclo[4,3,1,1³,⁸]undecane-3-amine in 100 ml. of anhydrous toluene, 9 g. of pyridine are added and the whole is then refluxed for 30 minutes. It is then concentrated in vacuo. The crystal slurry which remains is washed twice with 25 ml. of 2 N hydrochloric acid each time. After recrystallizing from methanol, the pure N-(p-tolylsulfonyl)-N'-(tricyclo[4,3,1,1³,⁸]undec-3-yl)-urea melts at 174–176°.

What is claimed is:

1. An N'-substituted N-arylsulfonyl-urea of the formula

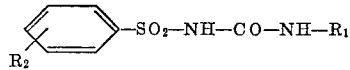

wherein $R_1$ represents the tricyclo[4,3,1,1³,⁸]undec-3-yl radical, and $R_2$ represents a member selected from the group consisting of chlorine, fluorine, bromine, lower alkyl, lower alkenyl, lower alkoxy, acetyl and methylthio.

2. N - (p - tolysulfonyl) - N' - (tricyclo[4,3,1,1³,⁸]un-dec-3-yl)urea.

3. N - p - chlorophenylsulfonyl - N' - (tricyclo[4,3,1, 1³,⁸]undec-3-yl)urea.

4. N - (p - fluorophenylsulfonyl) - N' - (tricyclo[4,3,1, 1³,⁸]undec-3-yl)-urea.

5. N - phenylsulfonyl - N' - (tricyclo[4,3,1,1³,⁸]un-dec-3-yl)-urea.

6. N - (p - methoxy - phenylsulfonyl) - N' - (tricyclo-[4,3,1,1³,⁸]undec-3-yl)-urea.

7. N - (p - acetyl - phenylsulfonyl) - N' - (tricyclo[4, 3,1,1³,⁸]undec-3-yl)-urea.

8. N - (p - bromophenylsulfonyl) - N' - (tricyclo[4,3,1,1³,⁸]undec-3-yl)-urea.

9. N - (p - ethoxyphenylsulfonyl) - N' - (tricyclo[4,3,1,1³,⁸]undec-3-yl)-urea.

10. N - (p - methylthiophenylsulfonyl) - N' - tricyclo-[4,3,1,1³,⁸]undec-3-yl)-urea.

11. An N'-substituted N-arylsulfonyl-urea of the formula

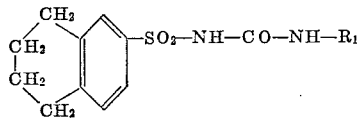

wherein $R_1$ represents the tricyclo[4,3,1,1³,⁸]undec-3-yl radical.

References Cited

UNITED STATES PATENTS
3,270,054    8/1966    Gagneux et al. _____ 260—564

FOREIGN PATENTS
6,404,755    11/1964    Netherlands.

OTHER REFERENCES
Gerzon et al., J. Med. Chem., vol. 6, pp. 760 to 763 (1963).

JOHN D. RANDOLPH, *Primary Examiner.*

U.S. Cl. X.R.

260—563, 557, 247.1, 453, 544; 167—65